(12) United States Patent
Morris et al.

(10) Patent No.: US 10,284,413 B2
(45) Date of Patent: *May 7, 2019

(54) FLEXIBLE FREQUENCY SYNTHESIS (71) Applicant: TELEFONAKTIEBOLAGET LM ERICSSON (PUBL), Stockholm (SE)

(72) Inventors: Bradley John Morris, Ottawa (CA); Arthur T. G. Fuller, Kanata (CA); Bengt Thomas Lejon, Vallentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,972

(22) Filed: Jan. 3, 2018

(65) Prior Publication Data

US 2018/0131555 A1 May 10, 2018

Related U.S. Application Data

(63) Continuation of application No. 15/308,003, filed as application No. PCT/IB2014/061126 on May 1, 2014, now Pat. No. 9,929,892.

(51) Int. Cl.
*H04L 27/36* (2006.01)
*H04B 1/00* (2006.01)
(Continued)

(52) U.S. Cl.
CPC ............ *H04L 27/365* (2013.01); *G06F 1/022* (2013.01); *G06F 1/08* (2013.01); *H04B 1/0035* (2013.01)

(58) Field of Classification Search
CPC ......... H04L 27/36; H04L 27/365; G06F 1/00; G06F 1/022; H04B 1/0028; H04B 1/0035
(Continued)

(56) References Cited

U.S. PATENT DOCUMENTS

| 8,768,248 | B2 * | 7/2014 | Sadr | ..................... G06K 7/0008 |
| | | | | 455/41.1 |
| 8,792,581 | B2 * | 7/2014 | Mu | ....................... H03F 1/3247 |
| | | | | 375/296 |

(Continued)

OTHER PUBLICATIONS

PCT Notification of Transmittal of the International Search Report and the Written Opinion of the International Searching Authority, or the Declaration for corresponding International Application No. PCT/IB2014/061126, dated Jan. 7, 2015.
(Continued)

*Primary Examiner* — Siu M Lee
(74) *Attorney, Agent, or Firm* — Patent Portfolio Builders, PLLC (57) ABSTRACT

According to some embodiments, an apparatus for generating multiple variable frequency and phase locked clock signals comprises complex tuners, digital up-samplers, image isolation filters, quadrature modulators, a combiner, a DAC, a local oscillator, and an analog filter. The complex tuners tune multiple digital baseband signals. The up-samplers interpolate the complex tuned digital signals such that one of the up-sampled images of each of the complex tuned digital signals corresponds to a desired frequency. The image isolation filters isolate images corresponding to the desired frequencies. The quadrature modulators convert the isolated images of the complex tuned digital signals into real digital signals. The combiner combines the real digital signals into a combined real digital signal. The DAC, driven by the local oscillator, converts the combined real digital signal into an analog clock signal. The analog filter then filters the analog clock signal to select images located at the desired frequencies.

18 Claims, 7 Drawing Sheets

(51) Int. Cl.
*G06F 1/02* (2006.01)
*G06F 1/08* (2006.01)

(58) Field of Classification Search
USPC .......................................... 375/295, 298, 344
See application file for complete search history.

(56) References Cited

U.S. PATENT DOCUMENTS

| | | | |
|---|---|---|---|
| 8,842,769 B2* | 9/2014 | Morris | H03D 7/161 |
| | | | 375/295 |
| 8,972,581 B2 | 3/2015 | Witt et al. | |
| 9,929,892 B2* | 3/2018 | Morris | H04L 27/365 |
| 2009/0316838 A1* | 12/2009 | Fuller | H04L 27/0014 |
| | | | 375/340 |
| 2010/0098191 A1* | 4/2010 | Morris | H03C 1/547 |
| | | | 375/322 |
| 2010/0127925 A1* | 5/2010 | Conroy | G01S 19/33 |
| | | | 342/357.63 |
| 2010/0232528 A1* | 9/2010 | Li | H04B 7/0639 |
| | | | 375/260 |
| 2013/0241757 A1* | 9/2013 | Morris | H04B 1/0007 |
| | | | 341/144 |
| 2013/0266056 A1* | 10/2013 | Zhang | H04L 27/3455 |
| | | | 375/232 |
| 2014/0062455 A1* | 3/2014 | Nakayama | G01R 35/005 |
| | | | 324/76.39 |
| 2014/0161000 A1* | 6/2014 | Fazlollahi | H04B 3/32 |
| | | | 370/280 |

OTHER PUBLICATIONS

Office Action, dated May 26, 2017, from corresponding U.S. Appl. No. 15/308,003.
Final Office Action, dated Sep. 26, 2017, from corresponding U.S. Appl. No. 15/308,003.

* cited by examiner

FLEXIBLE FREQUENCY SYNTHESIS

PRIORITY

This application is a continuation of U.S. patent application Ser. No. 15/308,003 entitled "FLEXIBLE FREQUENCY SYNTHESIS" which was filed on Oct. 31, 2016, which claims the benefit of PCT Application No. PCT/IB2014/061126, entitled "FLEXIBLE FREQUENCY SYNTHESIS", which was filed on May 1, 2014, all of which are incorporated by reference herein in their entireties.

TECHNICAL FIELD

Particular embodiments relate generally to frequency synthesis and more particularly to flexible frequency synthesis.

BACKGROUND

To reduce variations in products such as handheld radios used in wireless communication systems, manufacturers of components strive to create modules capable of handling many frequency bands (multi-band) in a single hardware solution. Modules such as modulators, demodulators, and signal amplifiers have multi-band capabilities. However, the local oscillator necessary for frequency translation has traditionally been difficult to make multi-band while still meeting the phase jitter and error vector magnitude (EVM) requirements for radio receivers or transmitters used in digital communications. Conventional systems require unique local oscillator modules for each frequency to meet the phase jitter and EVM requirements.

Traditional methods of achieving frequency flexibility result in several compromises. For example, a direct digital synthesizer (DDS) uses digital techniques to generate a frequency tunable output signal referenced to a fixed-frequency clock source. A DDS may comprise a numerically controlled oscillator (NCO) with a voltage controlled crystal oscillator (VCXO) used as a reference to a phase locked loop (PLL). Tuning of the DDS output signal may be accomplished by tuning the VCXO of the NCO. VCXO tuning may be achieved by configuring dividers, N and M, to scale a desired frequency and a reference frequency to a common comparison frequency. A DDS may also comprise a digital-to-analog converter (DAC) to convert the desired frequency into an analog signal.

The width of a VCXO's frequency tuning range may impact phase noise present in the DDS output signal. A wider VCXO tuning range results in higher phase noise, and a narrower tuning range results in lower phase noise. This limitation may restrict a traditional DDS to a narrow tuning range.

In some DDSs, the PLL may only scale the desired frequency (N is some integer greater than one) but not the reference frequency (M equals one). This scenario may result in frequency steps at multiples of the reference frequency only, which may limit the target frequency to an integer multiple of the VCXO. This limitation results in a trade-off between phase noise and frequency resolution. Lowering the reference frequency may result in higher ultimate phase noise because of the higher multiplication factor needed to reach the desired frequency.

To achieve greater tuning flexibility, some DDS may scale both the desired frequency (divide by N) and the reference frequency (divide by M) to achieve an N/M ratio of the desired and reference frequencies. This may result in tuning flexibility with a higher VCXO frequency, however it also results in spurious outputs related to the N/M ratio. The spurious outputs may change with the configured frequency. Thus, phase noise of a conventional DDS is a function of the desired output frequency relative to the reference clock and the DAC. Additionally, the output frequency of a conventional DDS may be limited to less than or half the frequency of the reference clock.

Conventional systems also have difficulty synthesizing frequency independent phase locked clocks. Traditionally, multiple clocks may be generated by multiple PLLs all locked to a common reference frequency. However, those multiple clocks may experience phase wander, even though they are locked to a common reference frequency, because of slight differences in the multiple active circuits (e.g., phase detectors, frequency dividers, etc.) used to generate each clock. Circuits driven by these multiple clocks must be designed with complicated logic to compensate for the phase wander.

SUMMARY

According to some embodiments, an apparatus for generating variable frequency clock signals comprises a complex tuner, a digital up-sampler, an image isolation filter, a quadrature modulator, a digital-to-analog convertor (DAC), a local oscillator, and an analog filter. The complex tuner is configured to tune a digital baseband signal to produce a complex tuned digital signal translated in the frequency domain. The digital up-sampler is configured to interpolate the complex tuned digital signal by N to create N equally spaced images (105) in the frequency domain and one of the N images corresponds to a desired frequency. The image isolation filter is configured to isolate the one of the N images of the complex tuned digital signal that corresponds to the desired frequency. The quadrature modulator is configured to convert the isolated image of the complex tuned digital signal into a real digital signal. The digital-to-analog converter (DAC) is configured to convert the real digital signal into an analog clock signal. The local oscillator is configured to drive the DAC (110). The analog filter is configured to filter the analog clock signal to select an image located at the desired frequency.

According to some embodiments, an apparatus for generating multiple variable frequency and phase locked clock signals comprises a first and second complex tuner, a first and second digital up-sampler, a first and second image isolation filter, a first and second quadrature modulator, a combiner, a DAC, a local oscillator, and an analog filter. The first and second complex tuners are configured to tune a first and second digital baseband signal to produce a first and second complex tuned digital signal, respectively. The first digital up-sampler is configured to interpolate the first complex tuned digital signal by N to create N equally spaced images in the frequency domain and one of the N images corresponds to a first desired frequency. Similarly, the second digital up-sampler is configured to interpolate the second complex tuned digital signal by M to create M equally spaced images in the frequency domain and one of the M images corresponds to a second desired frequency. The first image isolation filter is configured to isolate the one of the N images of the first complex tuned digital signal that corresponds to the first desired frequency, and the second image isolation filter is configured to isolate the one of the M images of the second complex tuned digital signal that corresponds to the second desired frequency. The first and second quadrature modulators are configured to convert the isolated images of the first and second complex tuned digital signals into first and second real digital signals, respectively. The combiner is configured to combine the first real digital signal and the second real digital signal into a combined real digital signal. The DAC is configured to convert the combined real digital signal into an analog clock signal. The local oscillator is configured to drive the DAC. The analog filter is configured to filter the analog clock signal to select images located at the first desired frequency and the second desired frequency. The analog clock signal at the first desired frequency is substantially phase locked with the analog clock signal at the second desired frequency.

Particular embodiments may exhibit some of the following technical advantages. Particular embodiments may provide the ability to make very fine frequency adjustments at low implementation cost. Some embodiments achieve frequency tuning over a wide bandwidth using a fixed frequency reference oscillator. Because tuning of the reference oscillator is not necessary, a fixed oscillator with very low phase noise may be used. Thus, problems associated with tunable reference oscillators may be avoided. In addition, some embodiments may use a low complexity image isolation filter, resulting in reduced costs and lowered power consumption. Various embodiments may be capable of generating multiple phase locked clocks (e.g., no phase wander). Some embodiments may be useful for LTE equipment with low subcarrier frequency spacing. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-12 of the drawings, like numerals being used for like and corresponding parts of the various drawings.

Particular embodiments of the current disclosure perform frequency flexible tuning in the digital domain without using N/M ratios commonly used in a conventional DDS. Therefore, particular embodiments may not suffer from the same phase noise issues associated with a conventional DDS. In particular embodiments, tuning may be achieved by converting a baseband signal centered around 0 MHz (DC) to a complex signal at a low frequency and low sample rate, interpolating the tuned signal by N, isolating the desired frequency of the N interpolated frequencies, converting the isolated complex signal to a real signal with quadrature modulation, and converting the real signal to an analog clock signal using a DAC driven by a high quality local oscillator. An advantage of particular embodiments is that phase noise is determined by the quality of the DAC and the local oscillator, independent of the desired output frequency. Additionally, the output frequency of particular embodiments is not limited to less than or half the frequency of the reference clock. In particular embodiments, multi-band tuning across the entire output range of the DAC (e.g., multiple GHz) may be possible.

Another advantage of particular embodiments is the ability to generate any number of frequency independent and phase locked clocks. In the present disclosure, frequency independent and phase locked clocks may be generated by tuning multiple complex baseband signals to desired frequencies and then combining them into a single real signal as input to a DAC. Because the digital to analog conversion is performed by a single local oscillator and a single DAC, phase wander may be substantially eliminated between clock signals. Thus, frequency independent and phase locked clocks may be generated without the need for complicated subsequent circuits to reduce phase wander.

Figure 1:
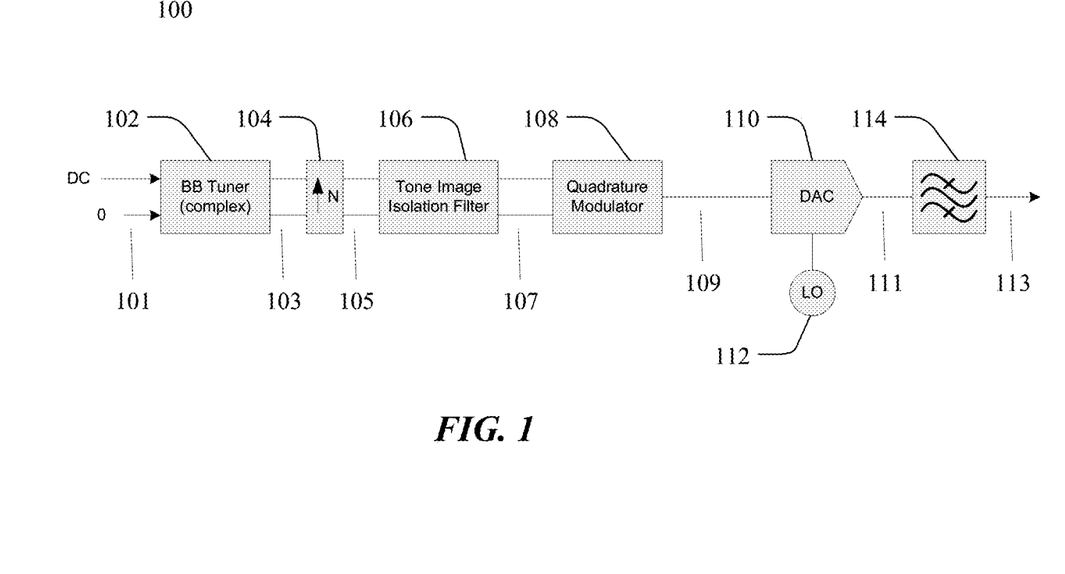
FIG. 1 is a block diagram illustrating an example of an apparatus for generating variable frequency clock signals, according to a particular embodiment.

FIG. 1 is a block diagram illustrating an example of an apparatus 100 for generating variable frequency clock signals, according to a particular embodiment. Apparatus 100 includes complex tuner 102, up-sampler 104, image isolation filter 106, quadrature modulator 108, DAC 110, local oscillator 112, and analog filter 114.

Complex tuner 102 translates a digital signal in the frequency domain. In particular embodiments, complex tuner 102 receives a digital baseband signal 101 as an input and translates the digital baseband signal to a complex tuned digital signal 103 corresponding to a desired frequency. In particular embodiments, digital baseband signal 101 may be In-phase (I) and Quadrature (Q) digital inputs that include a stream of samples representing at least one digital value. While FIG. 1 illustrates an example embodiment with input values of DC and 0, complex tuner 102 may receive any suitable complex digital signal as input.

Complex tuner 102 may perform tuning in any suitable manner. As one example, complex tuner 102 may perform complex tuning by mixing digital baseband signal 101 with a specified time-varying phase shift. As another example, complex tuner 102 may include a coordinate rotation digital computer (CORDIC) based digital complex tuner. An example of a CORDIC-based digital complex tuner capable of tuning a signal to any frequency is described in U.S. Pat. No. 8,243,857 entitled "CORDIC Based Complex Tuner With Exact Frequency Resolution."

In some embodiments, complex tuner 102 may be programmable. For example, complex tuner 102 may be programmable to change the desired tuning frequency. In particular embodiments, complex tuner 102 may convert a DC signal to a complex tuned digital signal at a low frequency and at a low sample rate.

Up-sampler 104 interpolates a signal to approximate a signal sampled at a higher rate. In some embodiments, up-sampler 104 may interpolate by an integer factor N, where N is greater than 1. In some embodiments, up-sampler 104 may insert N−1 zero-valued samples between each sample of the digital signal to create spectral repetition. A frequency domain representation of an up-sampled signal has N equally spaced images of the digital signal, one of which corresponds to a desired frequency. In some embodiments, up-sampler 104 interpolates a complex digital signal, as illustrated. In some embodiments, up-sampler 104 interpolates a real digital signal. An example representation of the N equally spaced images is described with reference to FIG. 2.

Figure 2:
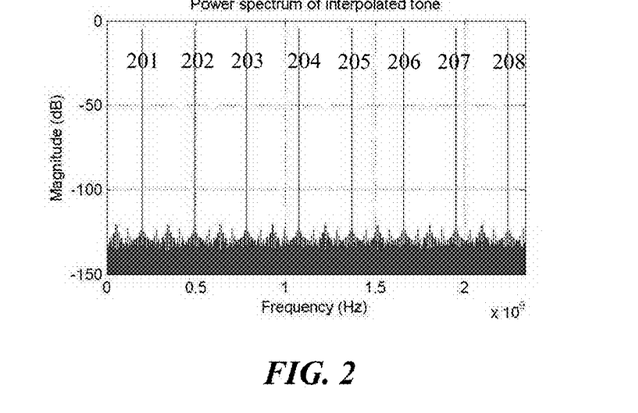
FIG. 2 is a graph of a power spectrum of an example interpolated signal, according to a particular embodiment.

In some embodiments, up-sampler 104 may interpolate complex tuned digital signal 103 output from complex tuner 102 such that one of N images 105 of complex tuned digital signal 103 corresponds to a desired frequency. In particular embodiments, a value of N may be chosen to minimize the overall complexity of complex tuner 102 and image isolation filter 106. For example, N may be chosen such that complex tuner 102 may use the lowest possible operational frequency capable of generating a desired frequency which may minimize overall costs associated with complex tuner 102 and image isolation filter 106. In some embodiments, N may be as low as 2. In some embodiments, N may be in the range from 32 to 64 or higher.

In particular embodiments, up-sampler 104 may be programmable. For example, programming up-sampler 104 with different values of N may configure up-sampler 104 to interpolate different images.

Image isolation filter 106 isolates one of the N images of a digital signal corresponding to a desired frequency. In particular embodiments, image isolation filter 106 may isolate one of N images 105 by attenuating all undesired images. In some embodiments, the input signal to image isolation filter 106 is a complex digital signal, and image isolation filter 106 performs as a complex filter. In some embodiments, the input signal to image isolation filter 106 is a real digital signal, and image isolation filter 106 performs as a real filter. Image isolation filter 106 may use a number of filter coefficients. In some embodiments, the number of filter coefficients may equal the integer interpolation factor N used by up-sampler 104.

In some embodiments, image isolation filter 106 may be programmable. For example, programming image isolation filter 106 with different filter coefficients may configure image isolation filter 106 to isolate a different desired frequency.

In particular embodiments, image isolation filter 106 may isolate one of N interpolated images 105 of a complex tuned digital signal 103 generated by up-sampler 104. The isolated image 107 may correspond to a desired frequency. Image isolation filter 106 removes N−1 of the N interpolated signals (all images except for the desired signal). In addition, the N−1 images may fall in the notches of the filter response. A particular advantage of this configuration is that a low complexity image isolation filter 106 may be used to efficiently filter the images.

As an example, a low complexity image isolation filter 106 may include a cascaded comb integrator (CCI) finite impulse response (FIR) filter. A FIR implementation may allow a direct polyphase implementation of image isolation filter 106. An example representation of an image isolation filter is described with reference to FIG. 3. An example representation of a filtered image corresponding to a desired frequency is described with reference to FIG. 4.

Quadrature modulator 108 may convert a complex (two-dimensional) digital signal to a real (one-dimensional) digital signal. In particular embodiments, the conversion may comprise simply discarding the imaginary part of the complex digital signal. In particular embodiments, the conversion may comprise simply discarding the real part of the complex digital signal. Some quadrature modulation techniques may create additional images in other Nyquist zones. If these additional images are undesired, the images may later be removed with filters. In particular embodiments, quadrature modulator 108 may convert the isolated image 107 from image isolation filter 106 into a real digital signal 109. An example representation of a real image and an additional image in an adjacent Nyquist zone is described with reference to FIG. 5.

DAC 110 converts a digital signal to an analog signal. In some embodiments, DAC 110 may support a conversion range of multiple GHz. In some embodiments, DAC 110 converts real digital signal 109 from quadrature modulator 108 into an equivalent analog clock signal 111. In some embodiments, the generated analog clock signal 111 may exist in any Nyquist zone of DAC 110.

Phase noise associated with the generated analog clock signal may be related to the quality of components used for DAC 110. Higher quality DAC 110 components may result in less phase noise associated with generated analog clock signal 111. In particular embodiments, DAC 110 is driven by local oscillator 112.

Local oscillator 112 is any oscillator capable of generating a periodic signal. In some embodiments, local oscillator 112 may comprise a crystal oscillator. Local oscillator 112 may comprise a fixed frequency oscillator, a variable frequency oscillator, or any oscillator capable of generating a periodic signal with suitable levels of phase noise. In particular embodiments, local oscillator 112 may drive DAC 110. In some embodiments, phase noise associated with the analog clock signal generated by DAC 110 may be related to the quality of local oscillator 112. A local oscillator constructed of high-Q components results in a periodic signal with less phase noise.

Analog filter 114 is any filter capable of selecting an analog signal or signals. In some embodiments, analog filter 114 is any filter for selecting and filtering the frequency spectrum output from DAC 110. In some embodiments, analog filter 114 removes unwanted images from Nyquist zones other than the Nyquist zone containing the clock signal at the desired frequency, such as clock signal 113. If quadrature modulator 108 generates unwanted images in Nyquist zones other than a desired Nyquist zone, analog filter 114 may be wide enough to allow any signal in the desired Nyquist zone to pass while filtering any signals in the unwanted Nyquist zone. Such a filter allows for tunability across an entire Nyquist zone. Analog filter 114 may select one, two, three, or any number of desired images.

In particular embodiments, the frequency of one of N images 105 of complex tuned digital signal 103, one of the frequencies contained in real signal 109 output from quadrature modulator 108, and one of the frequencies contained in analog signal 111 output from DAC 110, may all be the same as the desired frequency selected by analog filter 114. In particular embodiments, the frequency of one of N images 105 of complex tuned digital signal 103, the frequencies contained in real signal 109 output from quadrature modulator 108, and the frequencies contained in analog signal 111 output from DAC 110, may all correspond to, but not equal, the desired frequency selected by analog filter 114. Particular embodiments may use frequencies associated with components 102-110 that result in analog signal 111 containing a desired frequency. For example, image isolation filter 106 may isolate an image at a first frequency. After quadrature modulation and digital-to-analog conversion, resulting analog signal 111 may contain additional images of the first frequency in other Nyquist zones. Analog filter 114 may select an image from one of the other Nyquist zones as the desired frequency.

Particular advantages of apparatus 100 include generation of clock signals tunable over a wide spectrum with low phase noise characteristics. For example, a combination of components of apparatus 100 that includes fixed frequency local oscillator 112 constructed of high-Q components and DAC 110 that supports a frequency range of DC to 2 GHz may be capable of generating low phase noise clock signals tunable across the supported range of DAC 110. As another example, a combination of components of apparatus 100 that includes high quality narrow band tunable local oscillator 112 and DAC 110 that supports a frequency range of DC to 2 GHz may be capable of generating low phase noise clocks signals tunable over the wider frequency band supported by DAC 110, as opposed to the narrow band supported by local oscillator 112. In addition, particular embodiments of complex tuner 102 may provide the ability to make very fine frequency adjustments at low implementation cost.

FIG. 2 is a graph of a power spectrum of an example interpolated signal, according to a particular embodiment. FIG. 2 illustrates an example of N equally spaced images (peaks 201-208), where N=8, generated by a digital up-sampler, such as up-sampler 104. In particular embodiments, the frequency and power of peaks 201-208 may vary depending on the input signal received from complex tuner 102 and the integer interpolation value N.

Figure 3:
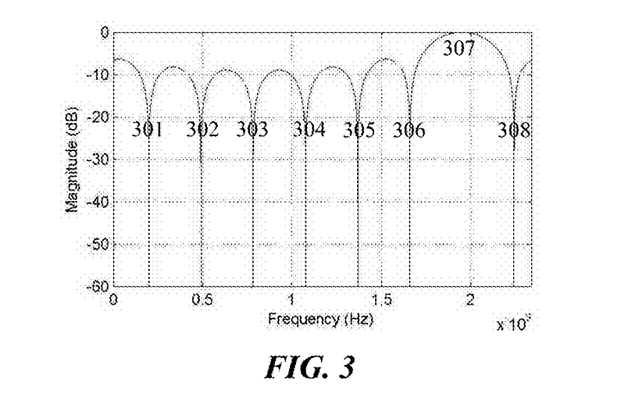
FIG. 3 is a frequency domain illustration of an example image isolation filter, according to a particular embodiment.

FIG. 3 is a frequency domain illustration of an example image isolation filter, according to a particular embodiment. FIG. 3 may represent an example image isolation filter, such as image isolation filter 106, using N filter coefficients, where N=8. In particular embodiments, filter notches at frequencies 301-306, and 308 match the frequencies of peaks 201-206, and 208 illustrated in FIG. 2, respectively. Applying the illustrated image isolation filter to the example output from up-sampler 104 illustrated in FIG. 2 may attenuate peaks 201-206, and 208. Because the illustrated image isolation filter does not comprise a notch at frequency 307, the illustrated image isolation filter will pass the signal associated with peak 207 illustrated in FIG. 2.

Figure 4:
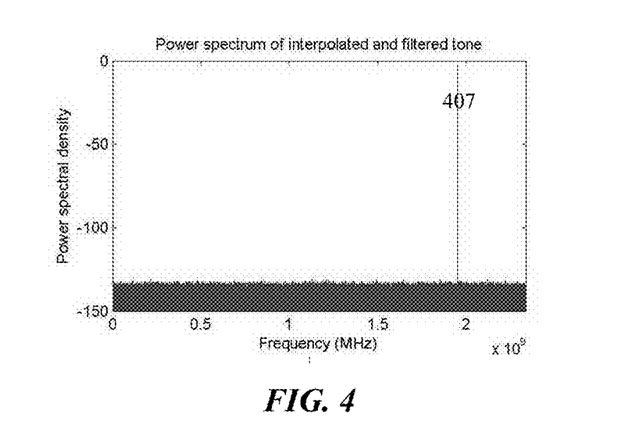
FIG. 4 is a graph of a power spectrum of an example interpolated and filtered signal, according to a particular embodiment.

FIG. 4 is a graph of a power spectrum of an example interpolated and filtered signal, according to a particular embodiment. FIG. 4 represents an example of a filtered signal, such as the example signal interpolated by up-sampler 104 illustrated in FIG. 2 and filtered by example image isolation filter 106 illustrated in FIG. 3, with a peak at frequency 407.

Figure 5:
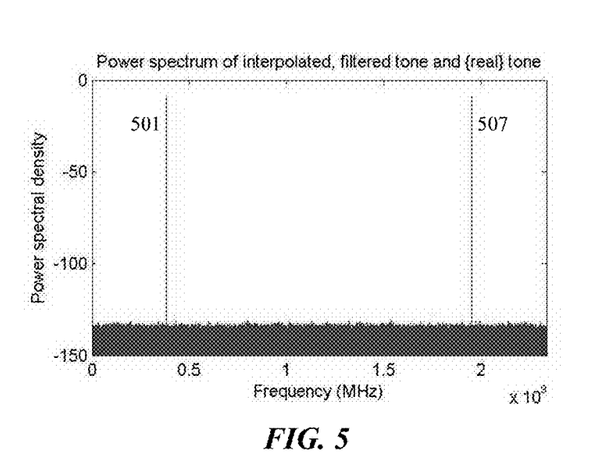
FIG. 5 is a graph of a power spectrum of an example interpolated, filtered signal and real signal, according to a particular embodiment.

FIG. 5 is a graph of a power spectrum of an example interpolated, filtered signal and real signal, according to a particular embodiment. FIG. 5 may represent an example of a real digital signal generated by quadrature modulator 108. In particular embodiments, quadrature modulator 108 may generate real signal 507, corresponding to peak 407 illustrated in FIG. 4, and additional image 501 in another Nyquist zone. In particular embodiments, analog filter 114 may remove the unwanted signal represented by image 501.

Figure 6:
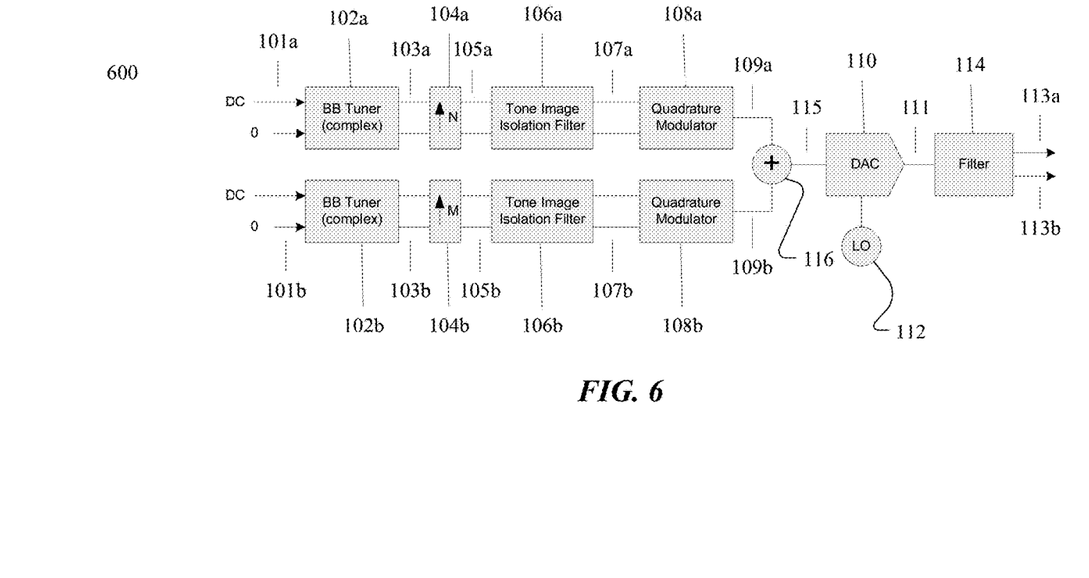
FIG. 6 is a block diagram illustrating an example of an apparatus for generating two variable frequency phase locked clock signals, according to a particular embodiment.

FIG. 6 is a block diagram illustrating an example of an apparatus 600 for generating two variable frequency phase locked clock signals, according to a particular embodiment. Apparatus 600 includes complex tuners 102a and 102b, digital up-samplers 104a and 104b, image isolation filters 106a and 106b, quadrature modulators 108a and 108b, DAC 110, local oscillator 112, analog filter 114, and signal combiner 116. Components 102 to 114 are similar to the corresponding components described with reference to FIG. 1.

In particular embodiments, components 102a-108a may, in combination, generate real digital signal 109a with an image corresponding to a first desired frequency. Components 102b-108b may, in combination, generate a real digital signal 109b with an image corresponding to a second desired frequency.

Signal combiner 116 combines two digital signals into a single digital signal. In some embodiments, signal combiner 116 may combine real digital signal 109a output from quadrature modulator 108a and real digital signal 109b output from quadrature modulator 108b into a single real signal 115 that contains both the image selected by image isolation filter 106a and the image selected by image isolation filter 106b.

In some embodiments, DAC 110, driven by local oscillator 112, converts real digital signal 115 from signal combiner 116 into two analog clock signals 111. Because both clock signals are generated by DAC 110 and local oscillator 112, phase wander between the two analog clock signals 111 is substantially reduced or eliminated.

In some embodiments, static phase offset may exist between the two generated clock signals 111. Static phase offset may be controlled by configuring the initial phase parameters of one or both of complex tuners 102a and 102b. For example, the clock signal originally generated by complex tuner 102a may be phase locked to the clock signal originally generated by complex tuner 102b, but the two clock signals may be phase offset from each other by a static amount. In particular embodiments, phase parameters, such as the phase of the I/Q inputs to complex tuner 102a may be adjusted to compensate for the static phase offset. For example, a phase parameter of complex tuner 102a may be specified as 0 (no phase offset) while a phase parameter of complex tuner 102b may be specified as some offset from 0. In some embodiments, phase parameters of both complex tuner 102a and 102b may be specified as some offset from 0. Phase parameters may be controlled to remove static phase offset or controlled to achieve a desired static phase offset.

In some embodiments, analog filter 114 may comprise a duplexer. Analog filter 114 may be operable to separate the images of the clock signals generated by DAC 110 into two separate clock signals, 113a and 113b.

Figure 7:
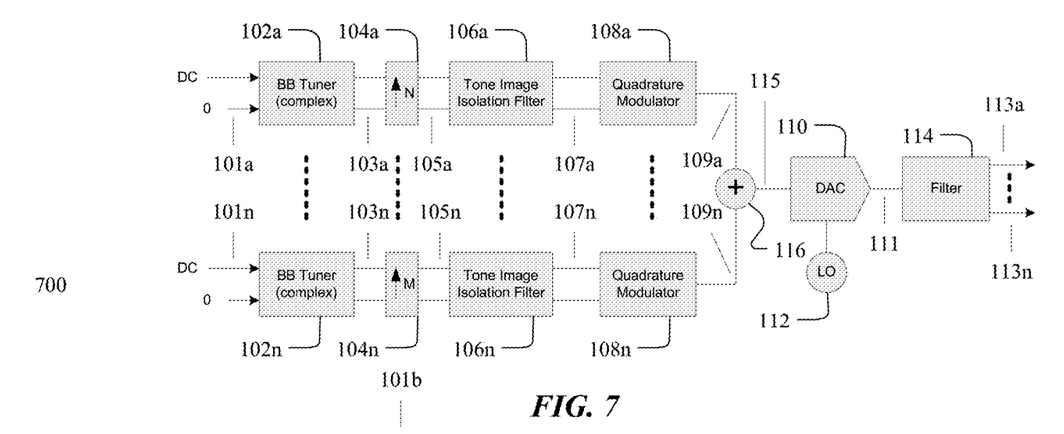
FIG. 7 is a block diagram illustrating an example of an apparatus for generating multiple variable frequency phase locked clock signals, according to a particular embodiment.

FIG. 7 is a block diagram illustrating an example of an apparatus 700 for generating multiple variable frequency phase locked clock signals, according to a particular embodiment. Apparatus 700 includes any number (n) of complex tuners 102, digital up-samplers 104, image isolation filters 106, and quadrature modulators 108. Apparatus 700 also includes DAC 110, local oscillator 112, analog filter 114, and signal combiner 116. Components 102-116 are similar to the corresponding components described with reference to FIGS. 1 and 6. In some embodiments, signal combiner 116 may combine real outputs 109a-109n of quadrature modulators 108a-108n into single real signal 115 that contains all the images selected by image isolation filters 106a-106n. In some embodiments, analog filter 114 may comprise a frequency separator. Analog filter 114 may be operable to separate the images of all the clock signals generated by DAC 110 into separate clock signals 113a-113n.

In some embodiments, the clock signals generated by DAC 110 may exist in different Nyquist zones. In a particular scenario where a desired frequency in one Nyquist zone collides with another desired frequency in another Nyquist zone, generating the frequency in one Nyquist zone may be sufficient because the digital to analog conversion process can create the frequency in the other Nyquist zone.

In a conventional system, circuitry to compensate for phase wander between three clock signals is more complicated than circuitry to compensate for phase wander between two clock signals, circuitry to compensate for phase wander between four clock signals is more complicated than circuitry to compensate for phase wander between three clocks signals, and so on. Thus, a particular advantage is that apparatus 700 may generate any number of frequency independent and phase locked clock signals. Because the generated clock signals are phase locked, no need arises to compensate for phase wander.

Figure 8:
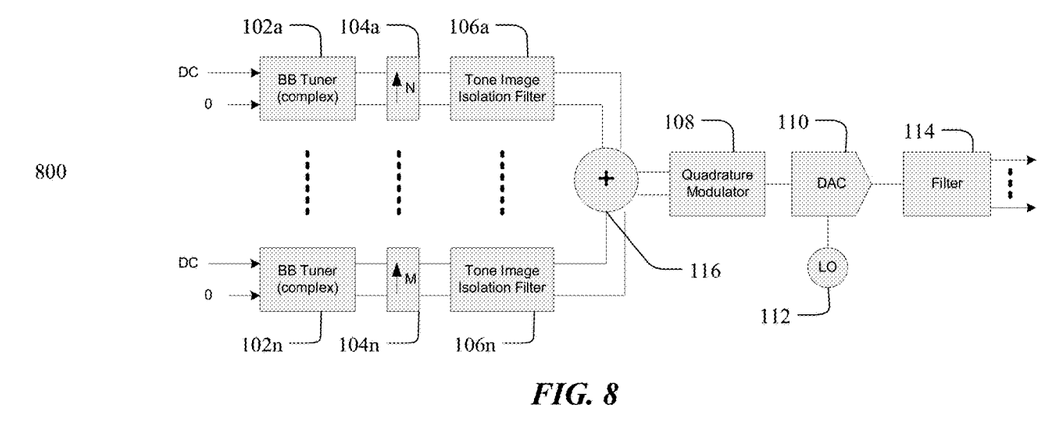
FIGS. 8-10 are block diagrams illustrating additional examples of apparatus for generating variable frequency clock signals, according to particular embodiments.
Figure 9:
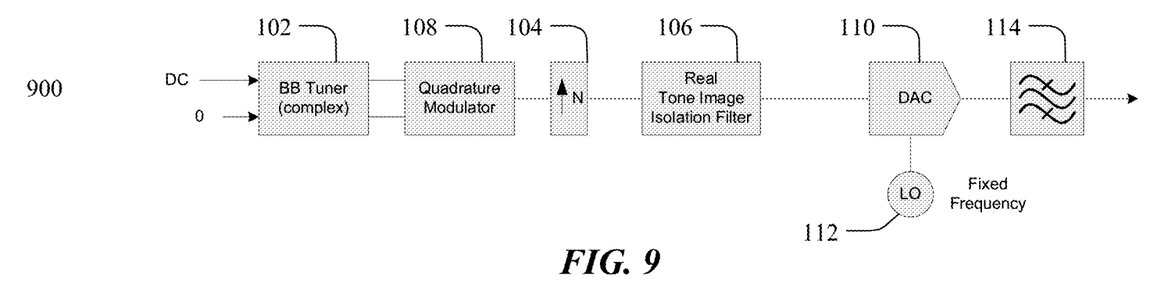
Figure 10:
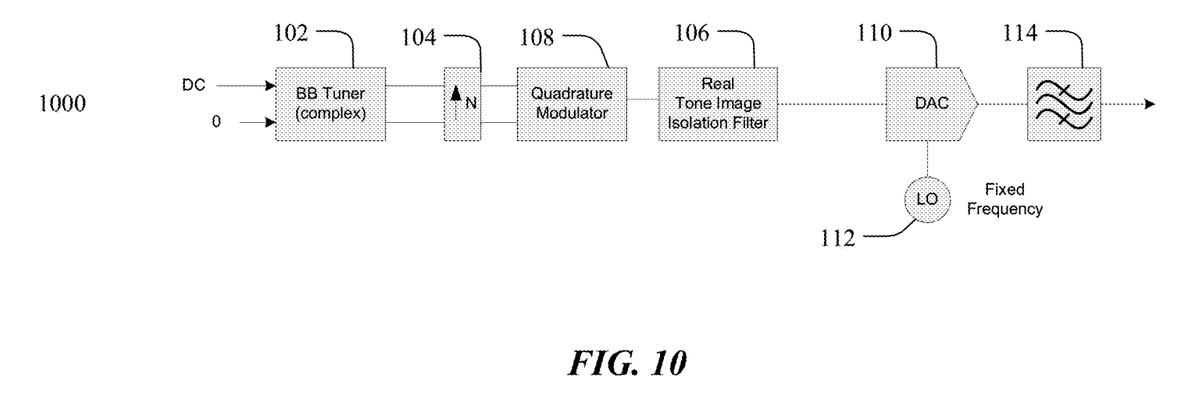

FIGS. 8-10 are block diagrams illustrating additional examples of apparatus for generating variable frequency clock signals, according to particular embodiments. Apparatus 800 illustrated in FIG. 8 is similar to apparatus 700 described with reference to FIG. 7 except for the signal combination function.

In some embodiments, signal combiner 116 combines complex signals. Signal combiner 116 may comprise a complex adder or any components suitable to combine complex signals. Signal combiner 116 may combine the complex outputs of image isolation filters 106a-106n into a single complex signal. Quadrature modulator 108 may convert the combined complex signal from signal combiner 116 into a combined real signal.

With reference to FIGS. 6-8, it will be understood that various integer factors associated with digital up-samplers 104a, 104b, . . . , 104n, such as N and M, may be different or may be the same. In particular embodiments, integer factors for all digital up-samplers may be the same.

FIG. 9 illustrates apparatus 900 similar to apparatus 100 described with reference to FIG. 1 except for the location of the quadrature modulation function. In some embodiments, quadrature modulator 108 may convert the complex signal from complex tuner 102 into a real signal. Up-sampler 104 may interpolate a real tuned digital signal output from quadrature modulator 108 such that one of the N images of the complex tuned digital signal corresponds to a desired frequency. Image isolation filter 106 may isolate one of the N interpolated images of a real tuned digital signal generated by up-sampler 104.

FIG. 10 illustrates apparatus 1000 similar to apparatus 100 described with reference to FIG. 1 and apparatus 900 described with reference to FIG. 9, except for the location of the quadrature modulation function. In some embodiments, quadrature modulator 108 may convert the N interpolated images of a complex tuned digital signal generated by up-sampler 104 into a real signal representing the N images. Image isolation filter 106 may isolate one of the N interpolated images of a real tuned digital signal generated by quadrature modulator 108.

Figure 11:
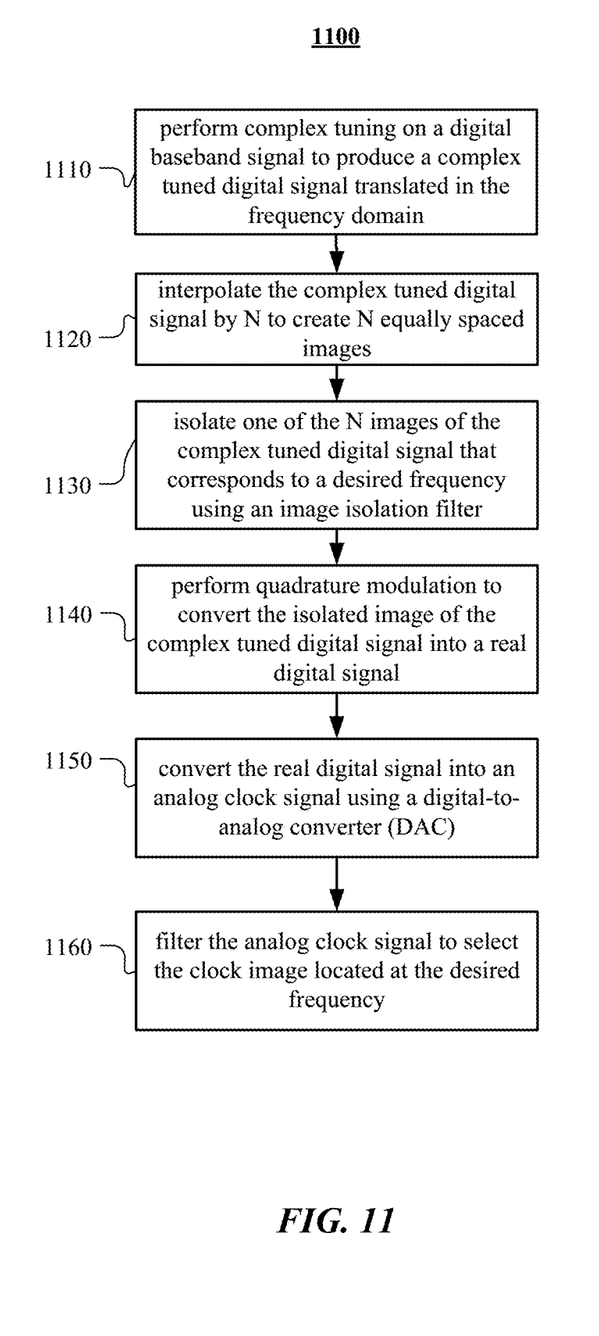
FIG. 11 is a flowchart illustrating an example method of generating variable frequency clock signals, according to a particular embodiment.

FIG. 11 is a flowchart illustrating an example method 1100 of generating variable frequency clock signals, according to a particular embodiment. In particular embodiments, one or more steps of method 1100 may be performed by components of apparatus 100 described with reference to FIG. 1.

The method begins at step 1110, where a complex tuner, such as complex tuner 102, performs complex tuning on digital baseband signal 101 to produce a complex tuned digital signal 103 translated in the frequency domain. For example, complex tuner 102 may receive I/Q components representing a baseband signal, tune the baseband signal to a different frequency, and output I/Q components representing the tuned digital signal.

At step 1120, an up-sampler, such as up-sampler 104, may interpolate a complex tuned digital signal by N to create N equally spaced images. For example, up-sampler 104 may receive the I/Q components output from complex tuner 102 and interpolate the signal such that one of the N images of the complex tuned digital signal 103 corresponds to a desired frequency.

At step 1130, an image isolation filter, such as image isolation filter 106, may isolate one of N images 105 of complex tuned digital signal 103 that corresponds to a desired frequency. For example, image isolation filter 106 may receive the I/Q components output from up-sampler 104 and isolate one of N interpolated images 105 of complex tuned digital signal 103. The isolated image may correspond to a desired frequency.

At step 1140, a quadrature modulator, such as quadrature modulator 108, may perform quadrature modulation to convert an isolated image of a complex tuned digital signal into a real digital signal. For example, quadrature modulator 108 may receive the I/Q components output from image isolation filter 106 and convert isolated image 107 from a complex digital signal 105 into a real digital signal 109.

At step 1150, a DAC, such as DAC 10, may convert real digital signal into an analog clock signal. For example, DAC 110 may receive real digital signal 109 output from image isolation filter 106 and convert real digital signal 109 into an equivalent analog clock signal 111. In particular embodiments, DAC 110 may be driven by local oscillator 112. In particular embodiments, local oscillator 112 may comprise a fixed frequency oscillator, a variable frequency oscillator, or any oscillator capable of generating a periodic signal with suitable levels of phase noise.

At step 1160, an analog filter, such as analog filter 114, may filter an analog clock signal to select a clock image located at a desired frequency. For example, analog filter 114 may receive the analog clock signal 111 from DAC 110 and select the analog clock signal 113 at the desired frequency.

In particular embodiments, complex tuner 102 may be programmable to tune complex baseband signal 101 to different frequencies. Up-sampler 104 may be programmable to use different interpolation factors N. Image isolation filter 106 may be programmable to use different filter coefficients. Modifying the programmable elements of components 102-106 may modify the frequency of generated analog clock signal 111. In particular embodiments, tuning of analog clock signal 111 may be accomplished without modifying the frequency of local oscillator 112. In particular embodiments, the tuning range of analog clock signal 111 may correspond to the output range of DAC 110. In particular embodiments, the phase noise associated with analog clock signal 111 corresponds to the quality of components comprising DAC 110 and local oscillator 112.

Modifications, additions, or omissions may be made to method 1100. Additionally, one or more steps in method 1100 of FIG. 11 may be performed in parallel or in any suitable order. For example, quadrature modulation may be performed between complex tuning and interpolation, as described with respect to FIG. 9. Quadrature modulation may be performed between interpolation and image isolation, as described with respect to FIG. 10.

Figure 12:
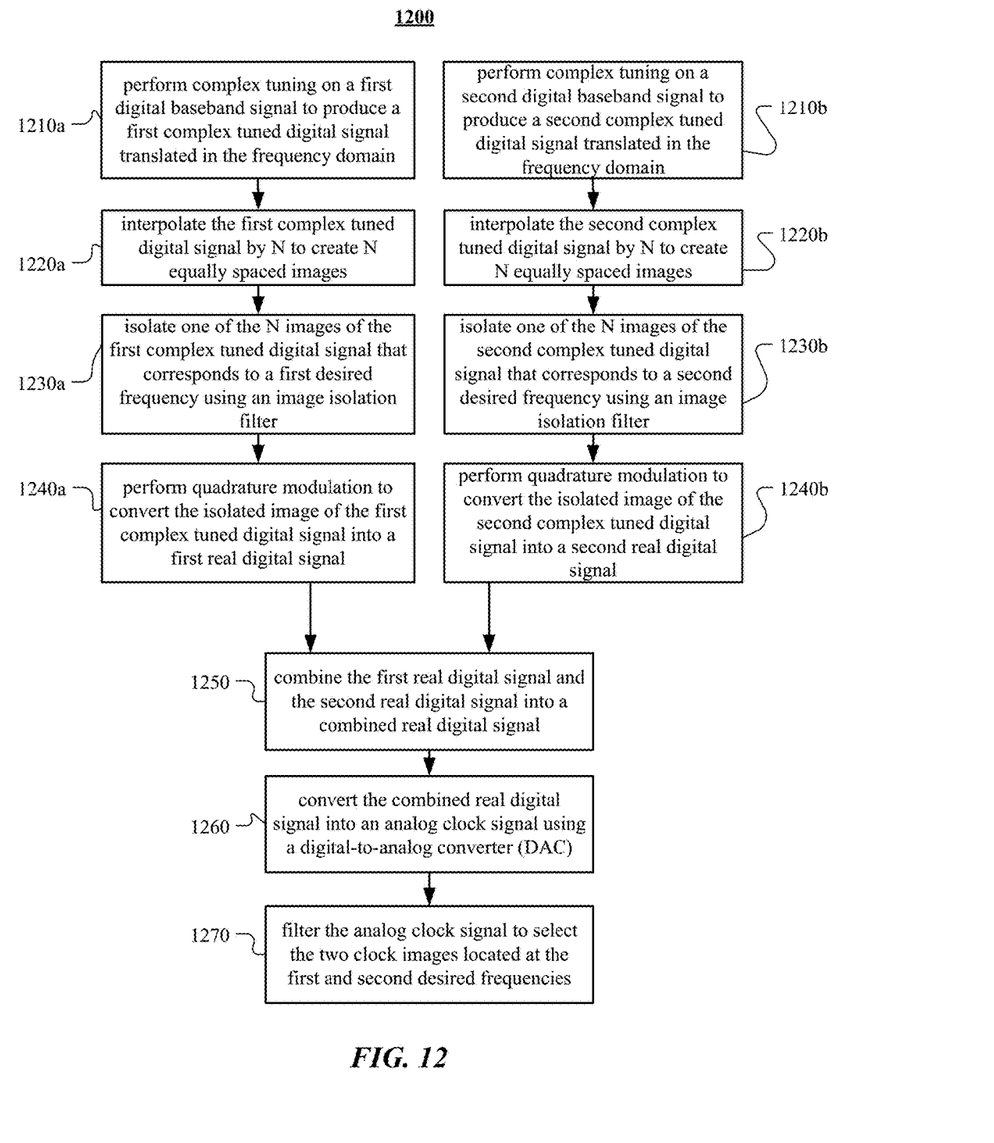
FIG. 12 is a flowchart illustrating an example method of generating frequency independent phase locked clock signals, according to a particular embodiment.

FIG. 12 is a flowchart illustrating an example method 1200 of generating frequency independent phase locked clock signals, according to a particular embodiment. In particular embodiments, one or more steps of method 1200 may be performed by components of apparatus 600 described with reference to FIG. 6, components of apparatus 700 described with reference to FIG. 7, and/or components of apparatus 800 described with reference to FIG. 8.

The method begins at steps 1210*a* and 1210*b*, where complex tuners, such as complex tuners 102*a* and 102*b*, perform complex tuning on digital baseband signals to produce complex tuned digital signals translated in the frequency domain. For example, complex tuner 102*a* may receive I/Q components representing baseband signal 101*a*, tune baseband signal 101*a* to a different frequency, and output I/Q components representing the tuned digital signal 103*a*. Complex tuner 102*b* may perform similar operations as complex tuner 102*a* for another desired frequency.

At steps 1220*a* and 1220*b*, up-samplers, such as up-samplers 104*a* and 104*b*, may each interpolate complex tuned digital signals by some integer values to create equally spaced images. For example, up-sampler 104*a* may receive the I/Q components output from complex tuner 102*a* and interpolate the signal such that one of N images 105*a* of the complex tuned digital signal 103*a* corresponds to a desired frequency. Up-sampler 104*b* may perform similar operations as up-sampler 104*a* for another desired frequency and similar or different values of N.

At steps 1230*a* and 1230*b*, image isolation filters, such as image isolation filters 106*a* and 106*b*, may each isolate one of the images of a complex tuned digital signal that corresponds to a desired frequency. For example, image isolation filter 106*a* may receive the I/Q components output from up-sampler 104*a* and isolate one of N interpolated images 105*a* of the complex tuned digital signal 103*a*. Isolated image 107*a* may correspond to a desired frequency. Image isolation filter 106*b* may perform similar operations as image isolation filter 106*a* for another desired frequency.

At steps 1240*a* and 1240*b*, quadrature modulators, such as quadrature modulators 108*a* and 108*b*, each may perform quadrature modulation to convert an isolated image of a complex tuned digital signal into a real digital signal. For example, quadrature modulator 108*a* may receive the I/Q components output from image isolation filter 106*a* and convert isolated image 107*a* from a complex digital signal into real digital signal 109*a*. Quadrature modulator 108*b* may perform similar operations as quadrature modulator 108*a* for a different signal.

At step 1250, a signal combiner, such as signal combiner 116, combines a first and second real digital signal into a combined real digital signal. For example, signal combiner 116 may combine real output 109*a* of quadrature modulator 108*a* and real output 109*b* of quadrature modulator 108*b* into single real signal 115 that contains both the image selected by image isolation filter 106*a* and the image selected by image isolation filter 106*b*.

At step 1260, a DAC, such as DAC 10, may convert a real digital signal into an analog clock signal. For example, DAC 110 may receive real digital signal 115 output from signal combiner 116 and convert real digital signal 115 into an equivalent analog clock signal 111. In particular embodiments, DAC 110 may be driven by local oscillator 112. In particular embodiments, local oscillator 112 may comprise a fixed frequency oscillator, a variable frequency oscillator, or any oscillator capable of generating a periodic signal with suitable levels of phase noise.

At step 1270, an analog filter, such as analog filter 114, may filter an analog clock signal to select multiple clock images located at desired frequencies. For example, analog filter 114 may receive the analog clock signal 111 from DAC 110 and select the analog clock signals at the desired frequencies, such as the frequencies isolated by image isolation filters 106*a* and 106*b*, and output analog clock signals 113*a* and 113*b*.

In particular embodiments, complex tuners 102*a* and 102*b* may each be programmable to tune complex baseband signal to different frequencies. Up-samplers 104*a* and 104*b* may each be programmable to use different interpolation factors. Image isolation filters 106*a* and 106*b* may each be programmable to use different filter coefficients. Modifying the programmable elements of components 102-106 may modify the frequencies of the generated analog clock signals. In particular embodiments, tuning of the analog clock signals may be accomplished without modifying the frequency of local oscillator 112. In particular embodiments, multiple phase locked clock signals are generated using a single local oscillator 112 and a single DAC 110. Using a single local oscillator and a single DAC to generate multiple phase locked clock signals may substantially reduce or eliminate phase wander between the clock signals. The multiple phase locked clock signals also benefit from low phase noise as described in reference to FIG. 11.

Modifications, additions, or omissions may be made to method 1200. Additionally, one or more steps in method 1200 of FIG. 12 may be performed in parallel or in any suitable order. For example, signal combination may be performed between image isolation and quadrature modulation, as described with respect to FIG. 8. Additionally, method 1200 may be expanded to generate any number of independent phase locked clock signals by increasing the number of parallel complex tuners 102, up-samplers 104, image isolation filters 106, and quadrature modulators 108.

While the above description specifically describes outputs of each of the components 102-116 being received by subsequent components, it is understood that other components may be included in the chain. For example, inclusion of additional filters, additional frequency modifying components, or any other suitable component is within the scope of this disclosure. In some embodiments, the components may be in a different order than those described herein.

In particular embodiments, particular combinations of components may reduce phase wander attributed to different sources. For example, phase wander may be attributed to the local oscillator and/or the DAC. While embodiments that comprise a single DAC and a single local oscillator may substantially reduce phase wander attributed to both sources, other combinations may substantially reduce phase wander associated with the local oscillator. For example, an embodiment comprising a single local oscillator driving multiple DACs may substantially reduce phase wander attributed the local oscillator, but not phase wander attributed to the DACs.

In some embodiments, some or all of the components in the apparatus for generating variable frequency clock signals described above may be implemented using field programmable gate arrays (FPGAs), application specific integrated circuits (ASICs), or any suitable combination of hardware or software. In some embodiments, the components may be implemented as individual devices that are cascaded together. In some embodiments the components may be implemented such that two or more components are implemented together and two or more such combined groups of components are cascaded together. For example, up-sampler 104 and image isolation filter 106 may be implemented together as a single module.

The methods and apparatus described herein may be used with any type of circuitry that may benefit from frequency flexible clock signals. In some embodiments, the methods and apparatus may be implemented in a radio communications base station. Examples of a base station may include a radio access node, such as an eNodeB, a node B, a base station, a wireless access point (e.g., a Wi-Fi access point), a low power node, a base transceiver station (BTS), a transmission point, a transmission node, a remote RF unit (RRU), a remote radio head (RRH), etc.

In some embodiments, the methods and apparatus may be implemented in a mobile station. Examples of a mobile station may include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A mobile station may also be referred to as user equipment (UE), a station (STA), a mobile station (MS), a device, a wireless device, or a terminal in some embodiments.

Some embodiments of the disclosure may provide one or more technical advantages. As an example, in some embodiments, the methods and apparatus disclosed herein may reduce size, cost, and power consumption of components compared to traditional techniques. Additionally, frequency flexibility may reduce or eliminate costs associated with producing unique components with unique local oscillators for each desired frequency.

Particular embodiments may provide the ability to make very fine frequency adjustments at low implementation cost. Some embodiments achieve frequency tuning over a wide bandwidth using a fixed frequency reference oscillator. Using an oscillator with very low phase noise may avoid problems associated with tunable reference oscillators. In addition, some embodiments may use a low complexity image isolation filter, resulting in reduced costs and lowered power consumption. Various embodiments may be capable of generating multiple phase locked clocks (e.g., no phase wander). Some embodiments may be useful for mobile communication equipment, such as LTE equipment, with low subcarrier frequency spacing.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
ASIC Application Specific Integrated Circuit
BTS Base Transceiver Station
CCI Cascaded Comb Integrator
CORDIC Coordinate Rotation Digital Computer
DAC Digital to Analog Converter
DC Direct Current
DDS Direct Digital Synthesizer
EVM Error Vector Magnitude
FIR Finite Impulse Response
FPGA Field Programmable Gate Array
GHz Gigahertz
I/Q In-phase/Quadrature
LEE Laptop Embedded Equipment
LME Laptop Mounted Equipment
LTE Long Term Evolution
M2M Machine to Machine
MHz Megahertz
MS Mobile Station
MTC Machine Type Communication
NCO Numerically Controlled Oscillator
PLL Phase Locked Loop
QPSK Quadrature Phase-Shift Keying
QAM Quadrature Amplitude Modulation
RRH Remote Radio Head
RRU Remote RF Unit
STA Station
UE User Equipment
VCXO Voltage Controlled Crystal Oscillator

The invention claimed is:

1. A method of generating variable frequency clock signals, the method comprising:
performing complex tuning on a first digital baseband signal to produce a first complex tuned digital signal translated in a frequency domain, wherein performing the complex tuning on the first digital baseband signal comprises controlling a first phase parameter;
performing complex tuning on a second digital baseband signal to produce a second complex tuned digital signal translated in the frequency domain, wherein performing the complex tuning on the second digital baseband signal comprises controlling a second phase parameter;
interpolating the first complex tuned digital signal by a first integer interpolation factor N to create N equally spaced images in the frequency domain, wherein one image of the N equally spaced images corresponds to a first desired frequency;
interpolating the second complex tuned digital signal by a second integer interpolation factor M to create M equally spaced images in the frequency domain, wherein one image of the M equally spaced images corresponds to a second desired frequency;
isolating the one image of the N equally spaced images of the first complex tuned digital signal using a first image isolation filter to output a first isolated image that corresponds to the first desired frequency;
isolating the one image of the M equally spaced images of the second complex tuned digital signal using a second image isolation filter to output a second isolated image that corresponds to the second desired frequency;
combining the first isolated image of the first complex tuned digital signal and the second isolated image of the second complex tuned digital signal into a combined complex signal;

performing quadrature modulation to convert the combined complex signal into a combined real signal;

converting the combined real signal into an analog clock signal using a digital-to-analog converter (DAC), wherein the DAC is driven by a local oscillator; and filtering the analog clock signal to select an analog clock signal located at the first desired frequency and an analog signal located at the second desired frequency, wherein the first phase parameter and the second phase parameter are controlled to control a static phase offset between the analog clock signal located at the first desired frequency and the analog clock signal located at the second desired frequency.

2. The method of claim 1, further comprising:

selecting the first integer interpolation factor N to minimize overall complexity of performing the complex tuning on the first digital baseband signal and the isolating of the one image of the N equally spaced images; and selecting the second integer interpolation factor M to minimize overall complexity of performing the complex tuning on the second digital baseband signal and the isolating of the one image of the M equally spaced images.

3. The method of claim 1, wherein the first image isolation filter uses N filter coefficients and the second image isolation filter uses M filter coefficients.

4. The method of claim 1, wherein the first image isolation filter and the second image isolation filter each comprises a cascaded comb integrator finite impulse response filter.

5. The method of claim 1, wherein the first image isolation filter does not perform computations on imaginary parts of the first complex tuned digital signal and the second image isolation filter does not perform computations on imaginary parts of the second complex tuned digital signal.

6. The method of claim 1, wherein performing the quadrature modulation to convert the combined complex signal into the combined real signal comprises discarding an imaginary part of the combined complex signal.

7. The method of claim 1, wherein performing the quadrature modulation to convert the combined complex signal into the combined real signal comprises discarding a real part of the combined complex signal.

8. A method of generating variable frequency clock signals, the method comprising:

performing complex tuning on a first digital baseband signal to produce a first complex tuned digital signal translated in a frequency domain, wherein performing the complex tuning on the first digital baseband signal comprises controlling a first phase parameter;

performing complex tuning on a second digital baseband signal to produce a second complex tuned digital signal translated in the frequency domain, wherein performing the complex tuning on the second digital baseband signal comprises controlling a second phase parameter;

interpolating the first complex tuned digital signal by a first integer interpolation factor N to create N equally spaced images in the frequency domain, wherein one image of the N equally spaced images corresponds to a first desired frequency;

interpolating the second complex tuned digital signal by a second integer interpolation factor M to create M equally spaced images in the frequency domain, wherein one image of the M equally spaced images corresponds to a second desired frequency;

isolating the one image of the N equally spaced images of the first complex tuned digital signal that corresponds to the first desired frequency, using a first image isolation filter;

isolating the one image of the M equally spaced images of the second complex tuned digital signal that corresponds to the second desired frequency, using a second image isolation filter;

performing quadrature modulation to convert the isolated image of the first complex tuned digital signal into a first real digital signal;

performing quadrature modulation to convert the isolated image of the second complex tuned digital signal into a second real digital signal;

combining the first real digital signal and the second real digital signal into a combined real digital signal;

converting the combined real digital signal into an analog clock signal using a digital-to-analog converter (DAC), wherein the DAC is driven by a local oscillator; and filtering the analog clock signal to select an analog clock signal located at the first desired frequency and an analog clock signal located at the second desired frequency, wherein the first phase parameter and the second phase parameter are controlled to control a static phase offset between the analog clock signal located at the first desired frequency and the analog clock signal located at the second desired frequency.

9. The method of claim 8, wherein the analog clock signal located at the first desired frequency is phase offset from the analog clock signal located at the second desired frequency by the static phase offset.

10. An apparatus for generating variable frequency clock signals, the apparatus comprising:

a first complex tuner configured to tune a first digital baseband signal to produce a first complex tuned digital signal translated in a frequency domain, wherein tuning the first digital baseband signal comprises controlling a first phase parameter;

a second complex tuner configured to tune a second digital baseband signal to produce a second complex tuned digital signal translated in the frequency domain, wherein tuning the second digital baseband signal comprises controlling a second phase parameter;

a first digital up-sampler configured to interpolate the first complex tuned digital signal by a first integer interpolation factor N to create N equally spaced images in the frequency domain, wherein one image of the N equally spaced images corresponds to a first desired frequency;

a second digital up-sampler configured to interpolate the second complex tuned digital signal by a second integer interpolation factor M to create M equally spaced images in the frequency domain, wherein one image of the M equally spaced images corresponds to a second desired frequency;

a first image isolation filter configured to isolate the one image of the N equally spaced images of the first complex tuned digital signal to output a first isolated image that corresponds to the first desired frequency;

a second image isolation filter configured to isolate the one image of the M equally spaced images of the second complex tuned digital signal to output a second isolated image that corresponds to the second desired frequency;

a signal combiner configured to combine the first isolated image of the first complex tuned digital signal and the second isolated image of the second complex tuned digital signal into a combined complex signal;

a quadrature modulator configured to convert the combined complex signal into a combined real signal;

a digital-to-analog converter (DAC) configured to convert the combined real signal into an analog clock signal;

a local oscillator configured to drive the DAC; and an analog filter configured to filter the analog clock signal to select an analog clock signal located at the first desired frequency and an analog clock signal located at the second desired frequency, wherein the first phase parameter and the second phase parameter are controlled to control a static phase offset between the analog clock signal located at the first desired frequency and the analog clock signal located at the second desired frequency.

11. The apparatus of claim 10, wherein the first integer interpolation factor N is selected to minimize overall complexity of the first complex tuner and the first image isolation filter, and wherein the second integer interpolation factor M is selected to minimize overall complexity of the second complex tuner and the second image isolation filter.

12. The apparatus of claim 10, wherein the first image isolation filter uses N filter coefficients and the second image isolation filter uses M filter coefficients.

13. The apparatus of claim 10, wherein the first image isolation filter and the second image isolation filter each comprises a cascaded comb integrator finite impulse response filter.

14. The apparatus of claim 10, wherein the first image isolation filter does not perform computations on imaginary parts of the first complex tuned digital signal and the second image isolation filter does not perform computations on imaginary parts of the second complex tuned digital signal.

15. The apparatus of claim 10, wherein the quadrature modulator converts the combined complex signal into the combined real signal by discarding an imaginary part of the combined complex signal.

16. The apparatus of claim 10, wherein the quadrature modulator converts the combined complex signal into the combined real signal by discarding a real part of the combined complex signal.

17. An apparatus for generating variable frequency clock signals, the apparatus comprising:

a first complex tuner configured to tune a first digital baseband signal to produce a first complex tuned digital signal translated in a frequency domain, wherein the first complex tuner comprises a first phase parameter to control a phase of the first complex tuned digital signal;

a second complex tuner configured to tune a second digital baseband signal to produce a second complex tuned digital signal translated in the frequency domain, wherein the second complex tuner comprises a second phase parameter to control a phase of the second complex tuned digital signal;

a first digital up-sampler configured to interpolate the first complex tuned digital signal by a first integer interpolation factor N to create N equally spaced images in the frequency domain, wherein one image of the N equally spaced images corresponds to a first desired frequency;

a second digital up-sampler configured to interpolate the second complex tuned digital signal by a second integer interpolation factor M to create M equally spaced images in the frequency domain, wherein one image of the M equally spaced images corresponds to a second desired frequency;

a first image isolation filter configured to isolate the one image of the N equally spaced images of the first complex tuned digital signal that corresponds to the first desired frequency;

a second image isolation filter configured to isolate the one image of the M equally spaced images of the second complex tuned digital signal that corresponds to the second desired frequency;

a first quadrature modulator configured to convert the isolated image of the first complex tuned digital signal into a first real digital signal;

a second quadrature modulator configured to convert the isolated image of the second complex tuned digital signal into a second real digital signal;

a combiner configured to combine the first real digital signal and the second real digital signal into a combined real digital signal;

a digital-to-analog converter (DAC) configured to convert the combined real digital signal into an analog clock signal;

a local oscillator configured to drive the DAC; and an analog filter configured to filter the analog clock signal to select an analog clock signal located at the first desired frequency and an analog clock signal located at the second desired frequency, wherein the first phase parameter and the second phase parameter are controlled to control a static phase offset between the analog clock signal located at the first desired frequency and the analog clock signal located at the second desired frequency.

18. The apparatus of claim 17, wherein the analog clock signal located at the first desired frequency is phase offset from the analog clock signal located at the second desired frequency by the static phase offset.

* * * * *